May 2, 1944.                A. L. LANGEL                2,347,694
                        MULTIPLE BAKING PAN
                      Filed Jan. 31, 1942         2 Sheets-Sheet 1
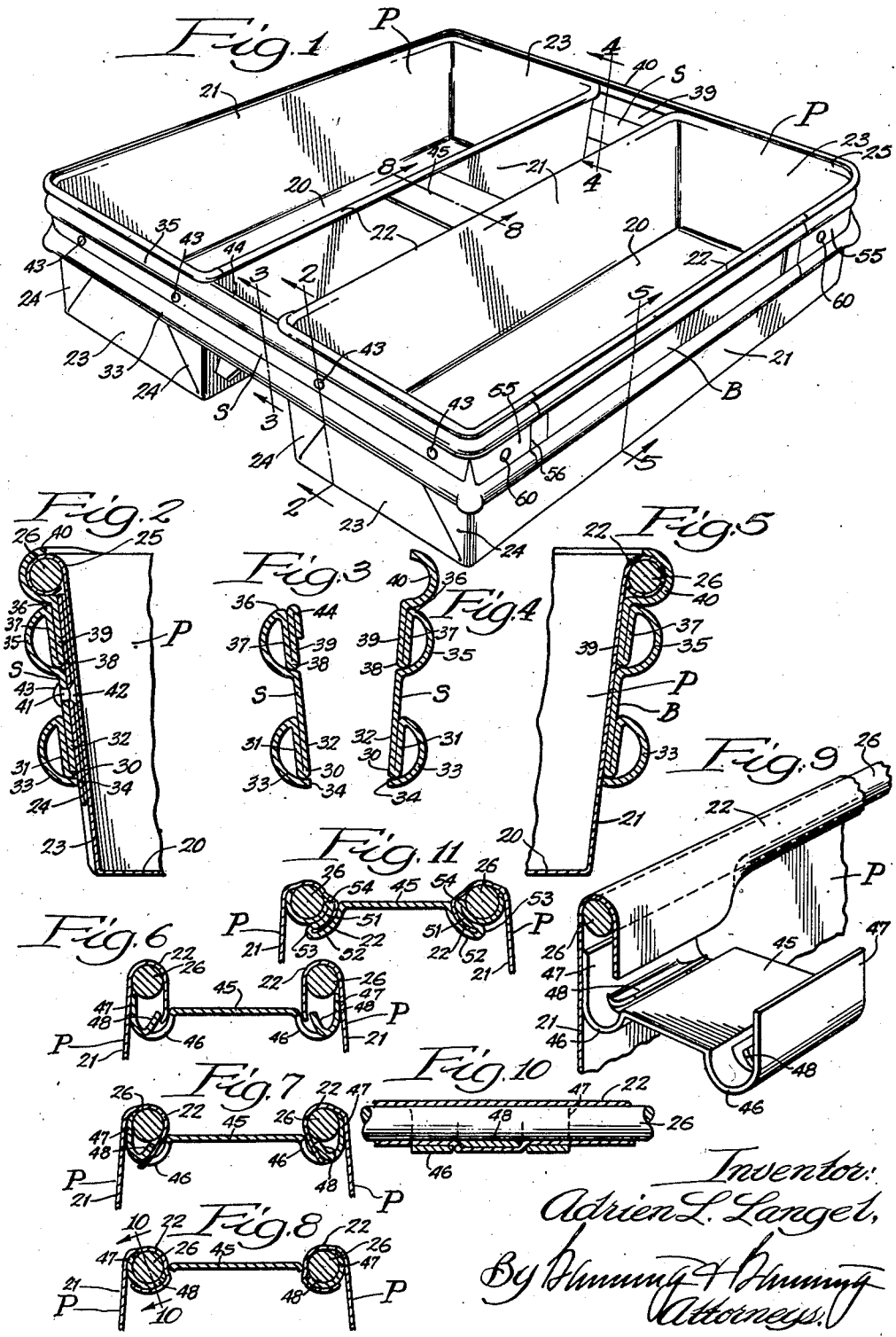

May 2, 1944. A. L. LANGEL 2,347,694
MULTIPLE BAKING PAN
Filed Jan. 31, 1942 2 Sheets-Sheet 2
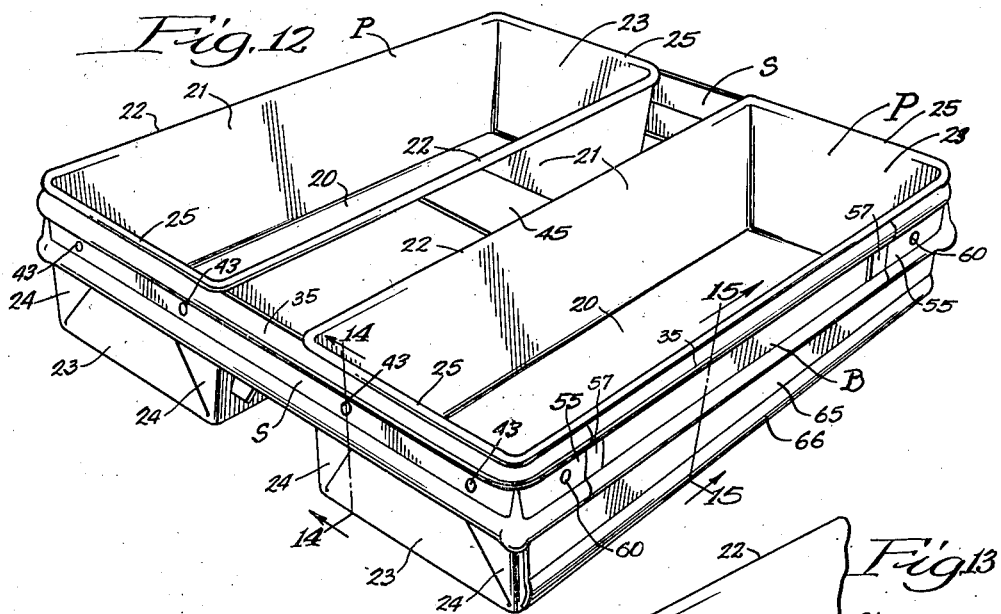
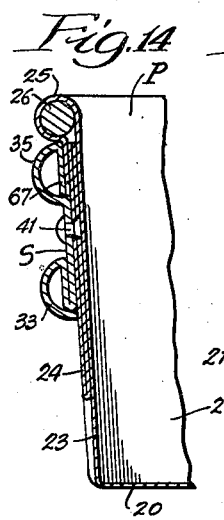
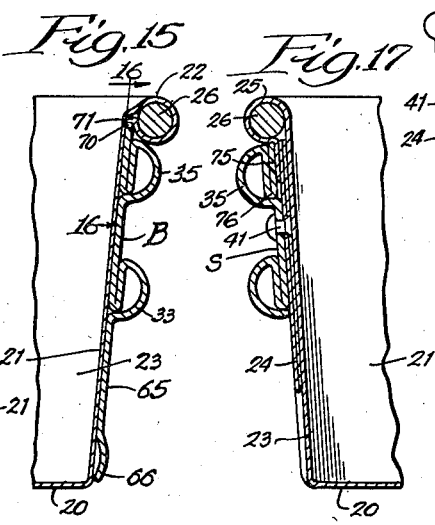
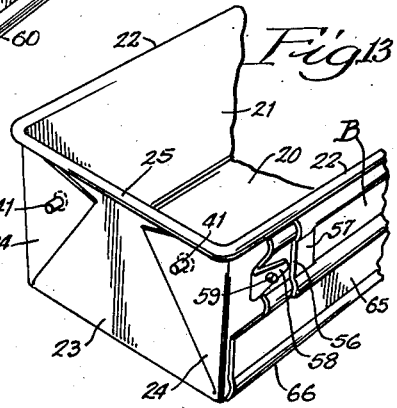
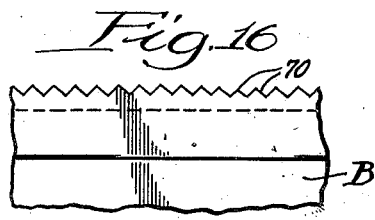
Inventor:
Adrien L. Langel,
By Schmming & Schmming
Attorneys.

Patented May 2, 1944

2,347,694

UNITED STATES PATENT OFFICE 2,347,694

MULTIPLE BAKING PAN

Adrien L. Langel, Chicago, Ill., assignor to Chicago Metallic Manufacturing Company, Chicago, Ill., a corporation of Illinois Application January 31, 1942, Serial No. 429,056

19 Claims. (Cl. 220—23.2)

The present improvements relate generally to multiple baking pans, i. e., a plurality of like pans which are fixedly united into a set for convenience in handling and use. More particularly I am here concerned with the means by which the pans are interconnected in a fixed unitary relation. Such means comprises straps extended lengthwise along the pan set, also bands at the ends thereof, together with means for interconnecting the straps and bands to each other and to the supported pans. In addition, my invention is concerned with the provision of an improved stay which may be interlocked with adjacent pans which are to remain in spaced relation, whereby to maintain the pans always at a fixed distance apart.

These several features of construction afford various advantages in the direction of strength, economy, simplicity and durability, all as will hereinafter appear, and certain suggestive embodiments thereof are illustrated in the accompanying drawings wherein:

Figure 1 is a perspective view of a pan set wherein are contained the present improvements;

Figs. 2-5 are enlarged sectional details taken, respectively, on lines 2—2, 3—3, 4—4 and 5—5 of Fig. 1;

Figs. 6-8 are enlarged sectional details, taken on line 8—8 of Fig. 1, but showing in Figs. 6 and 7, the cooperating parts of the stay and adjacent pans in two successive stages of assembly, a last stage being illustrated in Fig. 8;

Fig. 9 is a view in perspective of the stay and one associated pan in the first stage of assembly;

Fig. 10 is a detail in section, taken on line 10—10 of Fig. 8;

Fig. 11 is a view in section through a modified construction of the stay and the coacting parts of two associated pans;

Fig. 12 which is a pan set view in perspective shows a construction in which an improved form of end protection plate is used;

Fig. 13 is a fragmentary perspective view looking toward the end of one pan unit detached from the set;

Figs. 14-15 are enlarged details in section, taken, respectively, on lines 14—14 and 15—15 of Fig. 12;

Fig. 16 is a fragmentary view in elevation of one form of upper edge of an end protection plate, as seen along the line 16—16 of Fig. 15; and Fig. 17 which is a view similar to Fig. 14 shows a modification in the connecting strap.

In the showing of Fig. 1, two pans P are combined into a set to be handled as a unit. These pans which are alike comprise in each instance a sheet metal bottom 20 from opposite edges of which rise sides 21 which along their upper edges 22 are curled outwardly, downwardly, and then inwardly (see Figs. 5 and 8) to provide a marginal bead. Also rising from other opposite edges of the pan bottom are ends 23 with two-ply flaps 24 representing excess of material folded over to lie against the pan ends whose upper edges 25 are also curled outwardly, downwardly, and then inwardly (see Fig. 2) to provide a marginal bead in continuation of those along the top edges of the pan sides. Within the beaded edges of the pan is desirably secured a reinforcing wire 26. Both the side and end walls may be inclined outwardly to a slight extent to facilitate nesting of one pan set with another.

The means by which several pans may be united into a set, with the pan end walls aligned to form the sides of the pan unit, comprises a pair of straps S, one extended along each side of the pan set, together with a pair of bands B, one extended along each end of the pan set. Each strap is bent longitudinally upon itself at 30 (see Figs. 2 and 4) to form a lower folded edge from which rises two plies 31 and 32, the former to the outside of the other, then executing a downward bend, substantially in the form of a semi-circle, to provide an outwardly protruding lower rib 33. The bottom edge 34 of this lower rib, as shown, underlies the folded lower strap edge 30 in adjacent relation thereto, and confronts the proximate pan end wall against which it is free to abut. The inner ply 32 which is extended upwardly beyond the lower rib is itself bent outwardly and then inwardly in substantially semi-circular form to provide an upper rib 35, and along the upper edge of this rib the strap then executes a sharp bend at 36 preliminary to extending downwardly at 37 and then, upon making a reverse bend 38, upwardly again at 39. Above the upper rib the strap once more is curved outwardly, upwardly, and then inwardly, as at 40, in the form of a shield which is adapted to closely fit and follow around the reinforced bead along the upper edge of the proximate pan end.

A strap having such a cross-sectional contour provides a pair of outwardly extending ribs, one above the other is spaced relation, and thereabove a curved shield whose lower edge substantially abuts the proximate edge of the upper rib, each rib being extended outwardly from a two-ply base with which it is integrally connected along one edge, and both bases presenting an inner face in a common plane for most effective engagement with the end walls of the pans to which the straps may be connected as by rivets 41 which are extended through holes in the strap, at points between the upper and lower ribs, and through the flaps 24. In this way the rivet heads 42 may be positioned to the inside of each flap but to the outside of the pans, the opposite ends 43 of the rivets being then upset to lie in the sunken area upon the strap exterior between the ribs which afford protection thereto. Throughout the spaces between adjacent pans the curved top shield 40 may optionally be cut away, as suggested in Fig. 3 and as indicated on the near strap S shown in Fig. 1, and in this event the top edge of the strap, for the short distance between the pans, is desirably turned down upon itself, as at 44, to provide reinforcement for itself.

Additional connections between the pan side walls may also be provided. As shown, these take the form of stays, one between each pair of adjacent pan sides at points intermediately of their ends. Each stay comprises a flat bridge 45 whose opposite ends are alike in that each is provided with a curved channel 46 extended through approximately 180°, and terminating in an upstanding vertical flange 47 (see Fig. 9); and a struck-out tongue 48 whose base is approximately at the juncture of the flange 47 with the curved channel 46, the tongue initially inclining inwardly and upwardly (see Fig. 6). In this initial condition the stay is adapted for reception between the spaced side walls of two adjacent pans, the curling of whose upper edges awaits fitting of the stay in place, as suggested in Figs. 6 and 9. The flanges 47 are first interposed between these edges and the wire reinforcements 26 with the tongues 48 brought up against the under sides of the wires (see Figs. 6 and 7), and during this operation the pan edges 22, in a depending position, are curled around and under the tongues 48. Thereafter the interfitted parts are bent into their final interengaging positions (see Figs. 8 and 10) with the flanges 47 lapped around between the wires and pan walls, the tongues 48 lapped around between the wires, and the pan edges also lapped under the tongues and elsewhere around the under side of the wires. There is accordingly provided between each stay and the adjacent pan sides an interlock which will rigidly and securely maintain the associated pans in a fixed spaced relation.

A minor modification in the stay is suggested in Fig. 11 wherein the pan free edge 22 is received between two plies 51 and 52 formed by reversely bending at spaced points 53 and 54. The double reverse bends so provided are, without any struck-out tongues, adequate to resist almost any force tending to separate a pair of pans so connected by the stay under description.

Each strap S is turned through 90° or so at its ends to provide, in effect, ears 55 which extend around the corners of the pan set and lap upon the ends thereof for a short distance. The contour of the ears may be the same as the remainder of the strap, i. e., the upper and lower ribs, also the shield, may be continued through to the ends of the strap. These ears overlie the ends of a band B one of which is extended along each end of the pan set. As shown in Fig. 5, the band is formed with a cross-sectional contour substantially the same as the strap so that like parts thereof bear corresponding reference characters. The band ends, however, are for the short distance which underlies the ears 55 inset (see Fig. 13) as by reducing the upper and lower ribs to a single thickness thereby to provide vertical shoulders 56 which lie opposite and adjacent the end edges of the strap ears. In addition, I may protect the seam or joint at this point by an outward embossment 57 between the ribs of the band. I may also extend from ecah of the bands a tongue 58 through which is passed the shank of a rivet 59, the tongue being bent back upon itself so as to conceal the rivet head (not shown) which is thereby locked in place. The rivet shank protrudes outwardly for extension through a hole in the adjacent strap ear upon whose exterior face it is then upset as at 60 to complete the locking connection. In this way each band is interfitted with and locked to the overlapping ears of the two straps which extend along opposite sides of the pan set.

The band B shown in Figs. 1 and 5 may be formed with a depending skirt 65 inturned along the bottom 66 (see Figs. 12 and 13) to provide an end protection plate for the pan set. Also in Fig. 14 the strap is formed without any top shield, its upper rib 35 being fitted close against the under side of the bead along the top of the pan end whose free edge portion, after substantially encircling the reinforcing wire, extends downwardly to lie between the flaps on the pan end and the base 67 which depends from the upper edge of the upper rib 35. This base, however, is desirably inset slightly to provide space for accommodation of the depending wall edge. In this way the free edge portion of each pan end may be readily received and clamped securely in place behind the strap which is fixedly joined thereto, as by the rivet connection already described.

A special optional feature is also incorporated into the construction of Fig. 15. Here the upper edge of the protection plate (or band as the case may be) is extended slightly above the upper rib 35 to present serrations 70 to the inside of the bead. The upper edge portion of the pan wall 21 is here shown as encircling the reinforcing wire 26 and then terminating in a lip 71 which overlies the serrated top edge of the protection plate to be engaged thereby. In this way the pan edge terminating to the inside of the wire may be frictionally supported fixedly in its intended position.

The showing in Fig. 17 is much the same as that of Fig. 14 except that the base 75 of the upper rib 35 is two-ply as the result of a reverse bend at 76. By this construction a top edge of double thickness is presented to the under side of the bead to securely hold the upper edge portion of the pan wall fixedly in place.

The features of invention herein disclosed are particularly advantageous with a multiple baking pan that is subjected to hard and continuous use. The reinforcing ribs along the straps are spaced to provide a sunken area in which the upset ends of connecting rivets are normally protected from contact with external objects. The rivet connections are also readily accessible in case any repairs become necessary. Also the lower ribs terminate in strap edges which are adapted to abut the ends of the several pans thereby resisting effectively any pressure which otherwise might tend to crush the ribs. The upper rib of each strap is furthermore positioned adjacent the under side of the outturned reinforced pan edges and cooperates therewith in protecting the pans from injury along this vulnerable point. The strap may in fact cooperate with the turned upper edges of the pan walls to maintain them closely against the reinforcing wires around which they are curled so as to prevent any separation of such edges from the pans themselves.

In addition, the means of connection between the turned strap ends and the bands at the ends of the pan set are simple and very dependable, the rivets which are used for this purpose being positioned between extensions of the upper and lower ribs so as to receive protection therefrom and adjacent an embossment which supplies both an abutment for the strap ends and a protection for the rivet. With such means for interconnecting the several straps, the stay of this invention may also be used to special advantage. It provides intermediately of the pan ends a reinforcement by which to prevent the spaced pans from moving either toward or away from each other. Each stay is in the form of a bridge whose ends are about the pan walls, there being parts beyond the bridge ends which are interengaged with the pan walls to effectively prevent movement thereof in either direction. Such a bridge, made of one piece, may be readily applied to and interlocked with the pans during their assembly into a set, and when once installed may be depended upon to remain securely in place without further attention.

I claim:

1. A baking pan set consisting of a plurality of pans having aligned ends, and means interconnecting the pans comprising a strap extending lengthwise of the pan set and bent twice upon itself to provide two integral base plies from the outer ones of which the strap is outwardly bowed through substantially a semi-circle to form with the respective bases two spaced closed hollow ribs, one above the other, and means connecting the pans to the strap in a fixed unitary relation.

2. A baking pan set consisting of a plurality of aligned pans with out-turned reinforced edges, and means interconnecting the pans comprising a strap extending lengthwise of the pan set and formed with longitudinal bends to provide a pair of spaced two-ply bases from each of which is projected a convex rib, one above the other, and a shield above the upper rib having a concave inner face adapted to form a seat within which the reinforced edges of the pan ends may be received, and means extending through the strap in connection with the pan ends for securing the pans in a fixed unitary relation.

3. A baking pan set consisting of a plurality of aligned pans with out-turned reinforced edges, and means interconnecting the pans comprising a strap extending lengthwise of the pan set and formed with longitudinal bends to provide a pair of spaced two-ply bases from each of which is projected a convex rib, one above the other, and a shield at places above the upper rib having a concave inner face adapted to form a seat within which the reinforced edges of the pan ends may be received, a further longitudinal bend at places other than the shields providing at such points a three-ply reinforced strap edge, and means extending through the strap in connection with the pan ends for securing the pans in a fixed unitary relation.

4. A baking pan set consisting of a plurality of pans having aligned ends, and means interconnecting the pans comprising a strap extending lengthwise of the pan set and bent twice upon itself to form two integral base plies over the outer ones of each of which the material is again extended to provide at such points a third ply constituting a closed hollow rib at each such point, one above the other in spaced relation, the strap at points other than the ribs being of one ply thickness.

5. A baking pan set consisting of a plurality of aligned pans, and means interconnecting the pans at their ends comprising a strap extending lengthwise of the pan set and bent upon itself to form two integral base plies from the outer one of which the strap is outwardly bowed through substantially a semi-circle to form a rib one edge of which is extended past the proximate edge of the strap for engagement with the ends of the pans, and means connecting the strap with the ends of the pans in the set to secure the pans in a fixed unitary relation.

6. A baking pan set consisting of a plurality of aligned pans having at the wall edges thereof wires forming outstanding beads around which certain of the walls are curled to terminate in instanding lips, and means interconnecting the pans comprising a strap extending lengthwise of the pan set and bent twice upon itself to form two integral base plies, over the outer ones of which the material is again extended to provide a third ply constituting a rib at each such point, one above the other in spaced relation, the strap top edge being extended upwardly beyond the upper rib to engage and hold the lips in a fixed position whereby to prevent release of the walls from the wires.

7. A baking pan set consisting of a plurality of aligned pans having at the wall edges thereof wires forming outstanding beads around which certain of the walls are curled to terminate in instanding lips, and means interconnecting the pans comprising a strap extending lengthwise of the pan set having a serrated upper edge firmly engaged at points with the lips to prevent release of the walls from the wires.

8. A baking pan set consisting of a plurality of aligned pans having at the wall edges thereof wires forming outstanding beads around which certain of the walls edges are curled and then depended for a short distance to lie adjacent the exterior of the pan ends, and means interconnecting the pans comprising a strap extending lengthwise of the pan set and to the outside of the wall edges along the ends of the several connected pans and joined to each, provided along its upper edge with a rib having a base outset from the remainder of the strap a distance sufficient for accommodation of the depending wall edge upon the exterior of the pan ends.

9. In a baking pan set, a pair of pans fixedly connected in spaced relation, the adjacent pan walls at their tops being curled outwardly and around a reinforcing wire, and a one-piece stay interposed between the adjacent pan walls and in connection with each, the stay comprising a bridge extending between the pans, an upwardly facing channel at each end of the bridge, a flange extending upwardly from the outer side of each channel, and a tongue struck out from the channel near the base of the flange, the stay so formed being adapted for cooperation with the reinforced pan edges by extending the flange between the pan walls and the reinforcing wire, by positioning the wall top edges beneath the tongues, and by compressing these parts into close fitting relationship wherein the wall top edges are curled around and under the tongues.

and the tongues are curled around to partially embrace the reinforcing wire.

10. In a baking pan set, a plurality of pans fixedly connected in spaced relation, the adjacent pan walls at their tops being curled outwardly and around a reinforcing wire, and a one-piece stay interposed between the adjacent pan walls and in connection with each, the stay comprising a bridge whose opposite ends are adapted to abut adjacent the reinforced pan edges, and an oppositely extending flange and tongue adapted for an embracing interlocking connection with the reinforcing wire of the pans at the inside and underside of the reinforcing wire whereby to prevent movement of the pans toward or from each other when interlocked with the stay therebetween.

11. The combination with a pair of spaced pans having outstanding beads containing wires at the edges of the walls thereof, of a stay interposed between the pans, outer flanges on the stay seated about the wires of the adjoining beads, and tongues struck out from the stay at the bases of the flanges and extending away from the proximate pan walls in embracing adjacent relation to the wires.

12. A baking pan set consisting of a plurality of pans having aligned ends, and means interconnecting the pans comprising a strap extending lengthwise of the pan set and angularly bent to provide two integrally connected coplanular spaced bases at least one of which is multi-ply, the strap being further arcuately bent to provide opposite to and with each base an outwardly bowed hollow, closed rib, one disposed above the other, and means connecting the pans to the strap in a fixed unitary relation.

13. A baking pan set consisting of a plurality of pans having aligned ends, and means interconnecting the pans comprising a strap extending lengthwise of the pan set and angularly bent to provide two integrally connected co-planular spaced bases at least one of which is multi-ply, the strap being further arcuately bent to provide opposite to and with each base an outwardly bowed hollow closed rib, one disposed above the other, and means connecting the pans to the strap in a fixed unitary relation, the lower portion of the arcuately bent part of the lower rib extending inwardly under and in abutting relation with the lower base and into abutting relation with the pan.

14. A baking pan set consisting of a plurality of pans having aligned ends, and means interconnecting the pans comprising a strap extending lengthwise of the pan set and angularly bent to provide two integrally connected co-planular spaced multi-ply bases of which an edge of each is formed by a fold of the strap, the strap being further arcuately bent to provide opposite to and with each base an outwardly bowed hollow closed rib, one disposed above the other, and means connecting the pans to the strap in a fixed unitary relation, one portion of the arcuately bent part of each rib extending inwardly under and in engagement with a folded edge of the proximate multi-ply base.

15. A baking pan set consisting of a plurality of aligned pans having at the wall edges thereof wires forming outstanding beads around which certain of the walls are curled and then depended to lie adjacent the exterior of the pan ends, and means interconnecting the pans comprising a strap extending lengthwise of the pan set and in part to the outside of the depending walls along the ends of the several connected pans and joined to each, the strap face overlying the depending walls being recessed for a distance sufficient to accommodate the depending walls while permitting flat engagement elsewhere of the strap with the pan ends.

16. A baking pan set consisting of a plurality of aligned pans having at the wall edges thereof wires forming outstanding beads around which certain of the walls are curled to terminate in instanding lips, and means interconnecting the pans comprising a strap extending lengthwise of the pan set and bent upon itself to form a plurality of longitudinal ribs, one above another, the strap top edge terminating below the beads and being extended to engage and hold the lips in a fixed position whereby to prevent release of the walls from the wires.

17. A baking pan set consisting of a plurality of aligned pans having at the wall edges thereof wires forming outstanding beads around which certain of the walls are curled to terminate in lips below the beads adjacent the exterior faces of the walls, and a frame interconnecting the pans having a member extending alongside of the pan set and bent upon itself to form a plurality of longitudinal ribs, one above another, the top edge of the member terminating below the beads and being extended to engage and hold the lips in a fixed position whereby to prevent release of the walls from the wires.

18. A baking pan set consisting of a plurality of aligned pans having at the wall edges thereof wires forming outstanding beads around which certain of the wall edges are curled and then depended to lie adjacent the exterior of the pan walls, and means interconnecting the pans comprising a strap extending lengthwise of the pan set immediately below the pan beads and to the outside of the wall edges along the ends of the several connected pans and joined to each, provided along its upper edge with a rib in overlying relation to the depending wall edges and in engagement therewith at a point proximate to and below the beads and inwardly of their outer margins.

19. A baking pan set consisting of a plurality of aligned pans having at the wall edges thereof wires forming outstanding beads around which certain of the wall edges are curled and then depended to lie adjacent the exterior of the pan walls, and means interconnecting the pans comprising a member extending alongside of the pan set immediately below the pan beads and to the outside of the wall edges of the several connected pans and joined to each, provided along its upper edge with a rib in overlying relation to the depending wall edges and in engagement therewith at a point proximate to and below the beads and inwardly of their outer margins.

ADRIEN L. LANGEL.